(12) United States Patent
Nickel et al.

(10) Patent No.: US 10,969,611 B2
(45) Date of Patent: Apr. 6, 2021

(54) DEVICES FOR TRANSMITTING A MODULATED OPTICAL SIGNAL USING A FEW-MODE FIBER

(71) Applicant: GOVERNMENT OF THE UNITED STATES OF AMERICA, AS REPRESENTED BY THE SECRETARY OF THE NAVY, Arlington, VA (US)

(72) Inventors: Daniel V. Nickel, Prince Frederick, MD (US); Bryan Haas, Arnold, MD (US)

(73) Assignee: The Government of the United States of America, as represented by the Secretary of the Navy, Arlington, VA (US)

(*) Notice: Subject to any disclaimer, the term of this patent is extended or adjusted under 35 U.S.C. 154(b) by 0 days.

(21) Appl. No.: 16/036,593

(22) Filed: Jul. 16, 2018

(65) Prior Publication Data

US 2019/0018261 A1 Jan. 17, 2019

Related U.S. Application Data

(60) Provisional application No. 62/532,386, filed on Jul. 14, 2017.

(51) Int. Cl.
*G02F 1/01* (2006.01)
*H04B 10/25* (2013.01)

(52) U.S. Cl.
CPC ........... *G02F 1/0115* (2013.01); *H04B 10/25* (2013.01); *G02F 2201/04* (2013.01); *G02F 2201/05* (2013.01); *H04B 2210/006* (2013.01)

(58) Field of Classification Search
CPC .............. G02F 1/0115; G02F 2201/04; G02F 2201/05; H04B 10/25
USPC ............................................................ 385/2
See application file for complete search history.

(56) References Cited

U.S. PATENT DOCUMENTS

| | | | | |
|---|---|---|---|---|
| 5,003,623 A | * | 3/1991 | Asawa | G02B 6/4469 398/143 |
| 5,074,631 A | * | 12/1991 | Hamano | G02F 1/0327 385/3 |
| 5,361,157 A | * | 11/1994 | Ishikawa | G02F 1/225 385/39 |
| 5,426,339 A | * | 6/1995 | Wright | H03H 9/14505 310/313 B |

(Continued)

*Primary Examiner* — Akm E Ullah
(74) *Attorney, Agent, or Firm* — US Naval Research Laboratory

(57) ABSTRACT

A microwave photonic filter is provided. The filter includes an optical source, an electro-optic modulator, a single mode optical fiber, a few-mode optical fiber, and a photodiode. The electro-optic modulator is configured to receive an optical carrier from the optical source and an input electrical signal. The electro-optic modulator modulates the optical carrier based on the input electrical signal. The single mode optical fiber is configured to receive the modulated optical carrier from the electro-optic modulator. The few-mode optical fiber is configured to receive the modulated optical carrier from the single mode optical fiber. The filter includes one of a plurality of methods for causing higher order mode excitation in the few-mode fiber. The photodiode is configured to receive an output from the few-mode optical fiber.

7 Claims, 11 Drawing Sheets

(56) References Cited

U.S. PATENT DOCUMENTS

| | | | | |
|---|---|---|---|---|
| 5,621,560 A * | 4/1997 | Wood | H04B 10/2507 | 385/14 |
| 6,466,705 B2 * | 10/2002 | Tanaka | G02F 1/125 | 359/285 |
| 8,693,834 B2 * | 4/2014 | Bickham | G02B 6/0288 | 385/127 |
| 8,971,682 B2 * | 3/2015 | Evans | G02B 6/0288 | 385/11 |
| 9,698,911 B2 * | 7/2017 | Schaefer | H04B 10/503 | |
| 9,967,031 B1 * | 5/2018 | Middleton | H04B 10/2537 | |
| 10,359,563 B2 * | 7/2019 | Li | G02B 6/0288 | |
| 10,459,158 B2 * | 10/2019 | Wang | H04B 10/25 | |
| 10,520,670 B2 * | 12/2019 | Munige | G02B 6/02261 | |
| 2004/0047551 A1 * | 3/2004 | Ramachandran | G02B 6/29377 | 385/28 |
| 2005/0094952 A1 * | 5/2005 | Gonthier | G02B 6/14 | 385/100 |
| 2007/0086693 A1 * | 4/2007 | Murphy | G02B 6/2852 | 385/12 |
| 2008/0002928 A1 * | 1/2008 | Li | B82Y 20/00 | 385/14 |
| 2010/0028020 A1 * | 2/2010 | Gholami | G02B 6/0288 | 398/159 |
| 2010/0230621 A1 * | 9/2010 | Rideout | G02F 1/01 | 250/551 |
| 2011/0149383 A1 * | 6/2011 | Kashiwagi | H01S 3/094007 | 359/341.3 |
| 2011/0235166 A1 * | 9/2011 | Zhu | G02B 6/0288 | 359/341.3 |
| 2012/0105947 A1 * | 5/2012 | Kashiwagi | H01S 3/06733 | 359/341.3 |
| 2012/0113494 A1 * | 5/2012 | Yi | G02B 6/02085 | 359/238 |
| 2012/0219026 A1 * | 8/2012 | Saracco | G02B 6/14 | 372/21 |
| 2013/0064554 A1 * | 3/2013 | Li | G02B 6/02009 | 398/143 |
| 2013/0229649 A1 * | 9/2013 | Li | G01D 5/35364 | 356/73.1 |
| 2014/0368809 A1 * | 12/2014 | Chen | G01M 11/338 | 356/51 |
| 2015/0333830 A1 * | 11/2015 | Chen | H04B 10/2581 | 398/178 |
| 2016/0248223 A1 * | 8/2016 | Blauvelt | H01S 5/042 | |
| 2017/0054266 A1 * | 2/2017 | Hosokawa | H01S 3/0672 | |
| 2017/0070293 A1 * | 3/2017 | Chang | H04B 10/27 | |

\* cited by examiner

DEVICES FOR TRANSMITTING A MODULATED OPTICAL SIGNAL USING A FEW-MODE FIBER

BACKGROUND

Field of the Invention

The present application relates generally to microwave photonic filters.

Description of Related Art

Microwave photonics combines technology developed for both the microwave and optical parts of the electromagnetic spectrum. FIG. 1 is an exemplary block diagram of a generic microwave photonics link 100. An optical source 102 provides an optical carrier to an electro-optic modulator (EOM) 104. EOM 104 receives an electric RF signal 104 and modulates the RF signal 104 onto the optical carrier. The modulated optical signal 108 is provided to an optical signal processing element 110. The optical signal processing element 110 performs the desired function and transmits the optical signal to a photodiode 112 where the optical signal is converted back into an electrical signal 114. In link 100, the optical signal processing element 110 may be a filter that uses optical fibers.

Optical fibers may be categorized by the number of liner polarized (LP) modes they can carry. Optical fibers fall into three categories: single mode fibers, few mode fibers, and multimode fibers. A single mode fiber (SMF) can carry only one LP mode. A few mode fiber (FMF) can carry between 2-10 modes. A multimode fiber (MMF) can carry 10 or more modes.

One type of microwave photonic device is a conventional continuous wavelength source finite impulse response filter that employs single mode fibers, as illustrated in FIG. 2. An optical source 202 provides a single wavelength of light through a SMF 204 to EOM 206. EOM 206 receives an RF signal 208 and outputs a modulated optical signal through another SMF 210. The modulated optical signal is passed to a SMF fused coupler $212_1$ which sends the signal between a plurality of SMF optical delay lines (a.k.a. taps) $214_1 \ldots 214_n$. Taps $214_1 \ldots 214_n$ are each weighted and/or delayed in accordance with the design of the filter 200. The signals passing through taps $214_1 \ldots 214_n$ are then combined at another SMF fused coupler $212_2$. From there the combined signal travels through another SMF 216 to a photodiode 218 where the optical signal is converted into an electrical signal.

Conventional filter 200 has a number of drawbacks. For instance, filter 200 suffers from optical interference effects which adversely impact filter performance. This is especially true in the coherent regime where the differential optical delay is less than the coherence time of the source. To avoid coherent effects, optical delay based MPFs are implemented in the incoherent regime or with a completely different architecture from the one shown in FIG. 2. Those alternative architectures, however, increase the cost of the MPF and its fabrication complexity. Thus, it would be beneficial to have an MPF that overcomes one or more of these disadvantages while reducing cost and complexity of fabrication.

SUMMARY OF THE INVENTION

One or more the above limitations may be diminished by structures and methods described herein.

In one embodiment, a microwave photonic filter is provided. The filter includes an optical source, an electro-optic modulator, a single mode optical fiber, a few-mode optical fiber, and a photodiode. The electro-optic modulator is configured to receive an optical carrier from the optical source and an input electrical signal. The electro-optic modulator modulates the optical carrier based on the input electrical signal. The single mode optical fiber is configured to receive the modulated optical carrier from the electro-optic modulator. The few-mode optical fiber is configured to receive the modulated optical carrier from the single mode optical fiber. The single mode optical fiber is offset in a radial direction to the few mode optical fiber so as to generate at least one higher excitation mode in the few-mode optical fiber. The photodiode is configured to receive an output from the few-mode optical fiber.

In another embodiment, a microwave photonic filter is provided. The filter includes an optical source, an electro-optic modulator, a single mode optical fiber, a few-mode optical fiber, a mode converter, and a photodiode. The electro-optic modulator is configured to receive an optical carrier from the optical source and an input electrical signal. The electro-optic modulator modulates the optical carrier based on the input electrical signal. The single mode optical fiber is configured to receive the modulated optical carrier from the electro-optic modulator. The few-mode optical fiber is configured to receive the modulated optical carrier from the single mode optical fiber. The mode converter is configured to apply mechanical pressure to the few-mode optical fiber to generate at least one higher excitation mode in the few-mode optical fiber. The photodiode is configured to receive an output from the few-mode optical fiber.

BRIEF DESCRIPTION OF THE DRAWINGS

The teachings claimed and/or described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

Figure 1:
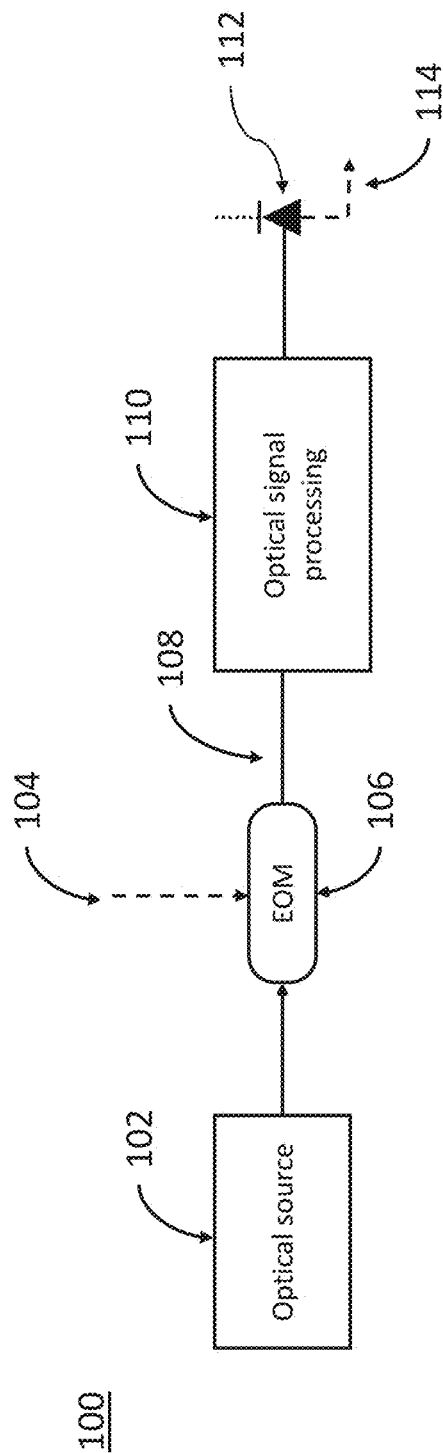
FIG. 1 is an exemplary block diagram of a generic microwave photonics link 100.
Figure 2:
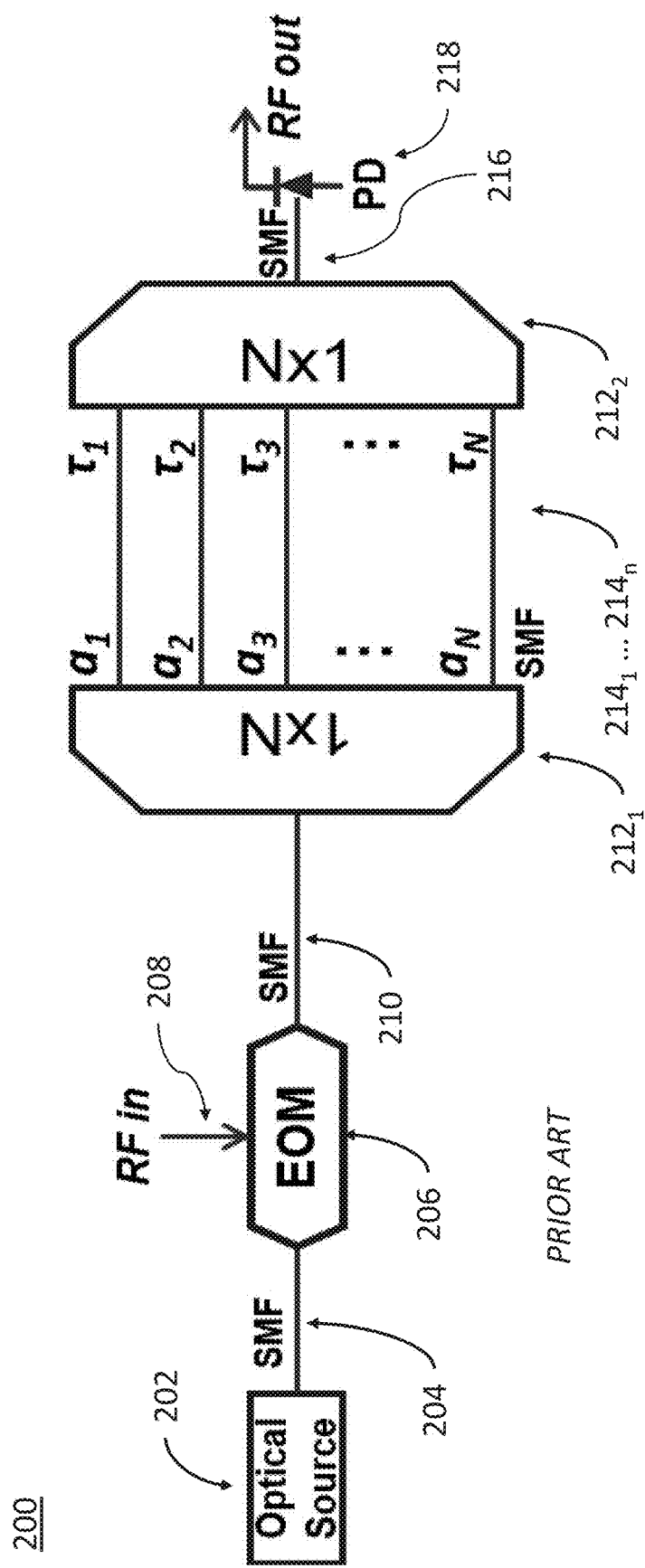
FIG. 2 illustrates a conventional continuous wavelength source finite impulse response filter.

Different ones of the Figures may have at least some reference numerals that are the same in order to identify the same components, although a detailed description of each such component may not be provided below with respect to each Figure.

DETAILED DESCRIPTION OF THE PREFERRED EMBODIMENTS

In accordance with example aspects described herein are few mode fiber based microwave photonic filters.

Figure 3:
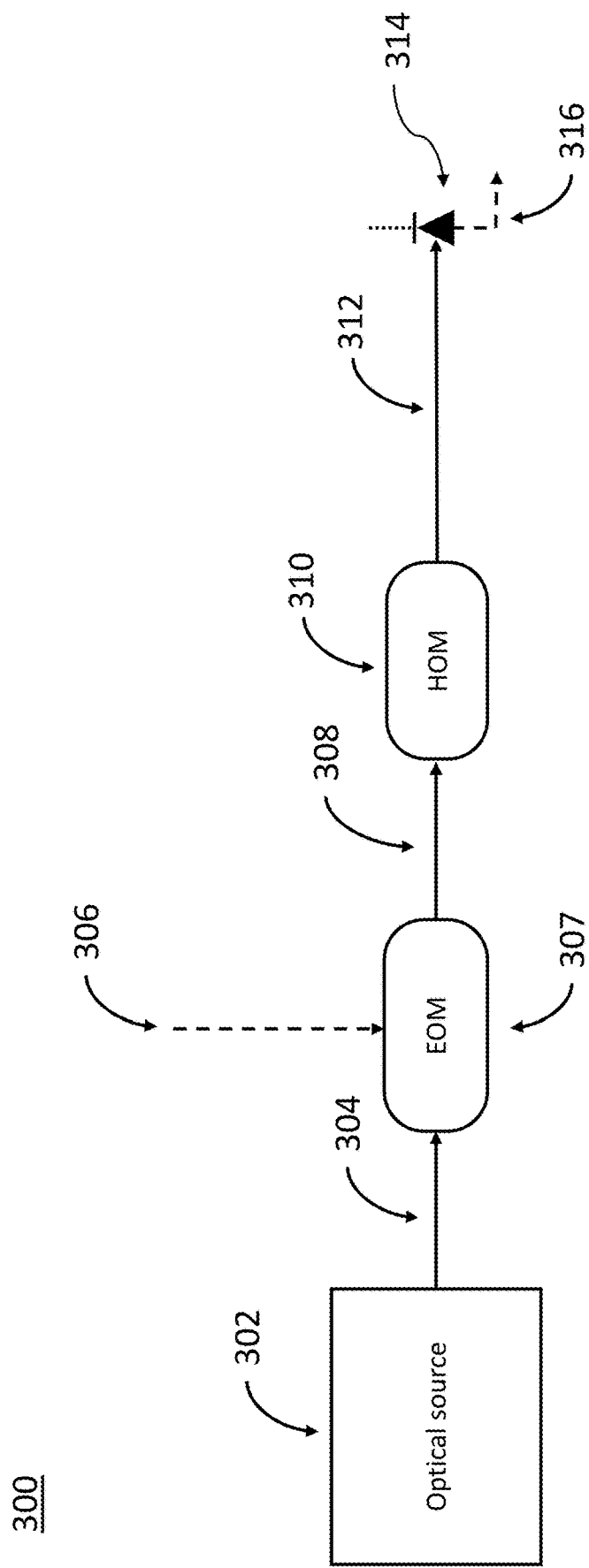
FIG. 3 is a schematic view of a few mode fiber based microwave photonic filter (FMF-MPF).

FIG. 3 is a schematic view of a few mode fiber based microwave photonic filter (FMF-MPF) 300. An optical source 300 provides an optical carrier through a SMF 304 to an RF/microwave EOM 307. EOM 307 modulates a RF/microwave signal of interest 306 onto the optical carrier. EOM 307 outputs the modulated optical carrier through free space or a SMF 308 to a higher order mode (HOM) exciter 310. HOM 310 may be implemented in a plurality of ways, as discussed below. Some of those embodiments are implemented by the relative arrangement of the SMF 308 and few mode fiber (FMF) 312. In another embodiment, the HOM exciter 310 is implemented via grating mode converters placed at selected positions along the FMF 312. The optical signal output from HOM exciter 310 contains a plurality of LP modes which traverse FMF 312, at different velocities, to its distal end. At the distal end of FMF 312, FMF 312 it is butt-coupled to photodiode 314 or spliced/connected to a multi-mode fiber pigtailed photodiode (not shown). Photodiode 314 generates a corresponding electrical signal 316. An exemplary photodiode 314 may be a Discovery Semiconductors DSH20H (20 microns).

One of the benefits of filter 300 over filter 200 is the inclusion of FMF 312. FMF 312 replaces the plurality of SMF taps in the conventional filter 200. Instead, the N-spatial modes of FMF 312 act as the filter's optical delay lines. The optical delays arises the from the differential mode group delays (DMGD) of the FMF 312 higher-order modes relative to its fundamental mode. Each spatial mode group (or tap) propagates via a common path to the photodiode 314, eliminating the need for the delay lines $212_1 \ldots 214_n$ and couplers $212_1$ and $212_2$ for recombination. Consequently, coherent interference effects are significantly reduced, as discussed below. In fact, the differential delays of the filters described herein range from 285 ps to 406 ps, and the coherence time of the optical source 250 ns. Thus, the filters described herein can operate well within the coherent regime. The use of a FMF 312 also minimizes the number of components necessary to implement a filter. As discussed below, the differential delays of filter 300 are determined by a product of the DMGDs of the modes per unit length of fiber, and the length of FMF 312. The filter coefficients (an) are determined by the relative amplitudes of the FMF 312 excited spatial modes at the photodiode 314. Hence, the filter shape is ultimately determined by the method used to excite the FMF's higher-order modes (HOM), the properties of the FMF 312 itself (e.g., DMGDs and fiber length), and effects during propagation, such as mode coupling and mode-dependent losses. Finally, the larger diameter of FMF 312 compared to an SMF offers relaxed nonlinear constraints compared to SMF fibers, allowing for higher power operation.

In a preferred embodiment, optical source 300 is a laser. In one embodiment, the optical source 300 is a continuous wavelength laser, such as distributed feedback (DFB) laser source with a wavelength of 1548 nm (±0.02 nm) and a coherence time of approximately 250 ns. In a preferred embodiment the laser beam from optical source 300 is provided to EOM 307. EOM 307 receives an RF/microwave signal of interest and modulates that signal onto the optical carrier (e.g., the laser beam). Exemplary EOMs 307 may be a quadrature-based Mach-Zehnder Modulator or an EOSpace AX intensity modulator. EOM 307 outputs the modulated optical signal. While the modulated optical signal may be output to HOM exciter 310 through free space, it may also be sent through a SMF 308 to HOM exciter 310. HOM exciter 310 may be implemented in a plurality of ways including, for example, an offset method, a variable method, or by mode converters, as discussed below.

Figure 4A:
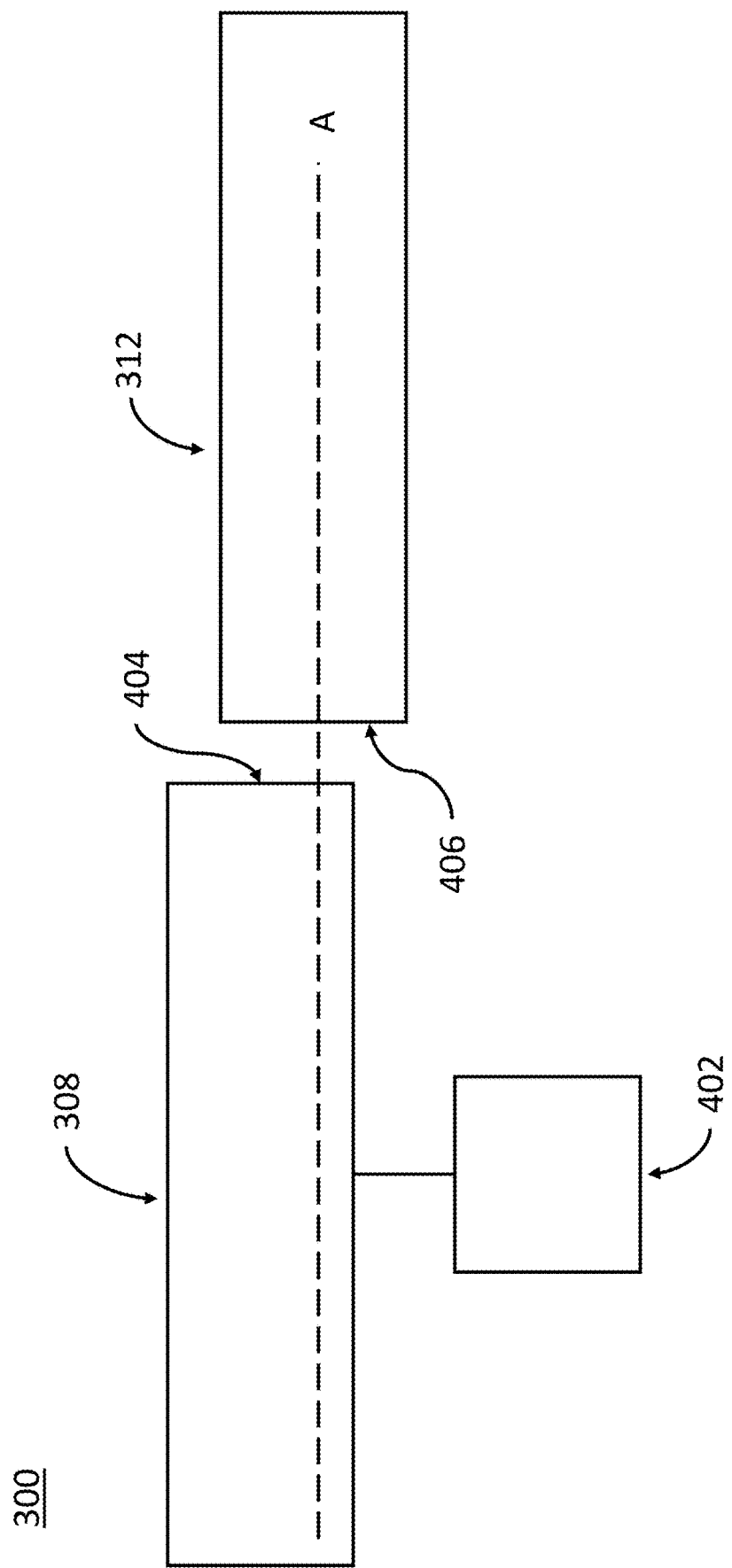
FIG. 4A illustrates the offset splice method of higher order mode (HOM) excitation.

FIG. 4A illustrates the offset splice method of HOM excitation. In this embodiment, SMF 308 is connected to a 3-axis translation stage 402 in order to vary the relative offset between its cleaved end-face 404 and the cleaved end-face 406 of the FMF 312, as measured relative to a radial axis of FMF 312. Here, the filter amplitude coefficients (as) of the modes in FMF 312 can be varied by varying the offset of between the end-faces 404 and 406. Thus, a desired filter shape can be selected by controlling the offset between the end-faces 404 and 406. Once, a desired filter shape is determined (by determining a relative positioning of 404 and 406 that produces the desired filter shape), the cleaved ends 404 and 406 can be permanently spliced together using, for example, a Fujikura FSM-40PM splicer. Once the ends 404 and 406 are spliced the amplitude coefficients ($a_n$) are fixed. However, the optical delays $\tau_n$ are determined by two factors: (i) the DMGDs of the FMF 312, and (ii) the length of FMF 312. Since the DMGDs of the FMF 312 are constant for a fixed wavelength, the free spectral range (FSR) of the filter 300 are adjusted by tailoring the length of the FMF 312. A person of ordinary skill will appreciate that once a desired set of amplitude coefficients are achieved, by determining a corresponding offset, the filter 300 can be manufactured without having to experimentally determine the desired offset again, but rather the ends can simply be spliced with the already determined offset. Moreover, a person of ordinary skill in the art would understand that, in this embodiment, the HOM exciter 310 is the junction between SMF 308 and FMF 312. In the case where EOM 307 outputs the modulated optical signal to free space, the offset is the distance from the A to the Gaussian spot of the modulated optical signal.

Of course, filter 300 could be implemented in a manner where ends 404 and 406 are not spliced, but rather the offset between them is variable. This may be achieved by use of the translation stage 402. This is conceptually the same as the offset method described above in that the filter amplitude coefficients are dependent on the spatial overlap of the excitation field with the modes of the FMF 312 at the interface between the ends 404 and 406. In the variable method, however, the amplitude coefficients can be dynamically controlled during the filter operation by adjusting the relative offset of ends 404 and 406 using translation stage 402. Like above, in this embodiment, a person of ordinary skill would understand that the HOM exciter 310 is the junction between SMF 308 and FMF 312, and that the relative offset between ends 404 and 406 is controllable.

Figure 4C:
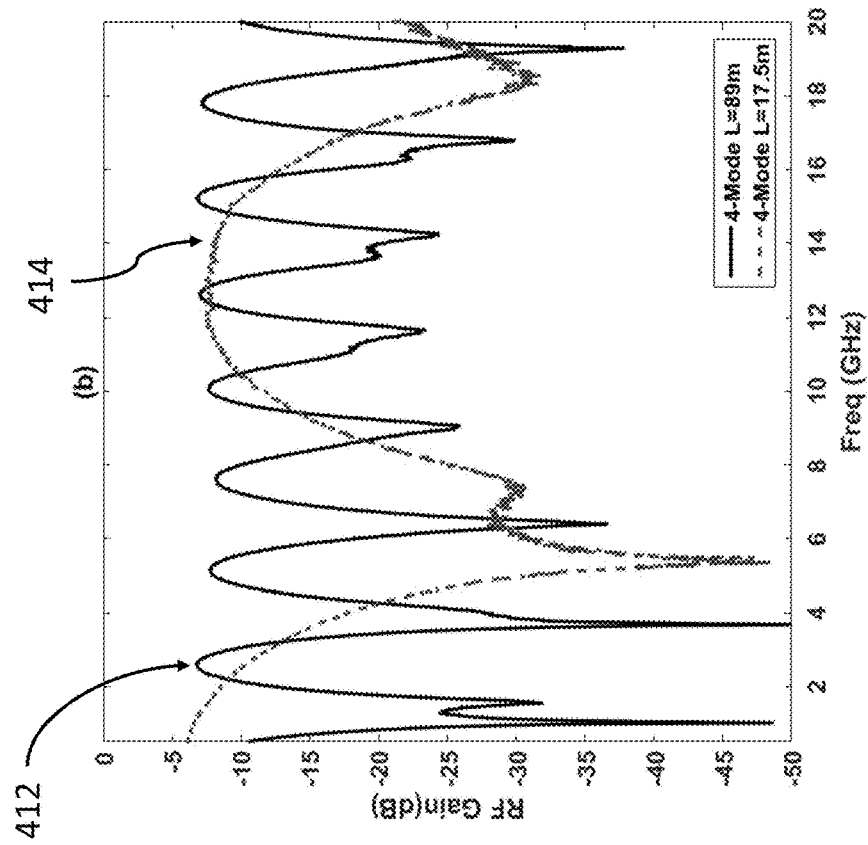
FIGS. 4B and 4C are power transfer functions of filters according to embodiments described herein.
Figure 4B:
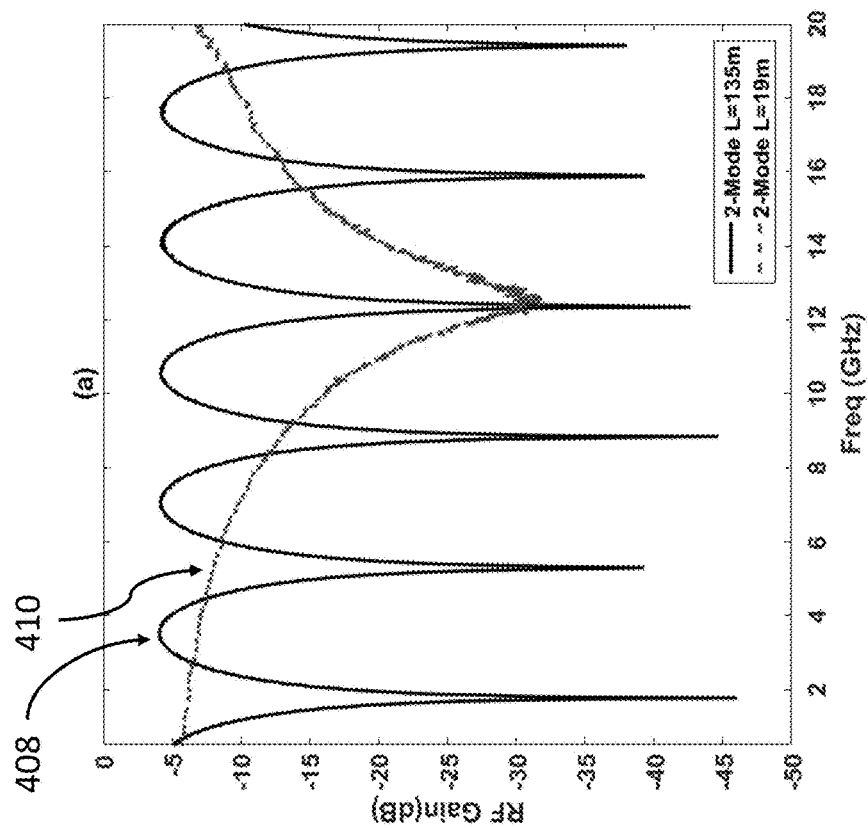

FIGS. 4B and 4C are power transfer functions (S21)/RF gain of 2-mode (FIG. 4B) and 4-mode (FIG. 4C) FMF-MPFs using an offset splice method for HOM exciter 310. FIG. 4B shows the results for two different lengths of FMF 312. Curve 408 are the results from an embodiment where FMF 312 is 135 m. Curve 410 are the results from an embodiment where FMF 312 is 19 m. FIG. 4B shows that FMF 312 supports the propagation of two mode groups ($LP_{01}$ and $LP_{11}$). FIG. 4B clearly shows the formation of two-tap notch filters due to the summations of its two differentially delayed modes ($LP_{01}$ and $LP_{11}$) on the photodiode 314. The two modes were mutually excited at HOM 310 (the splice point between ends 404 and 406) due to the slight offset of the SMF 308 and the FMF 312. In the particular case of FIG. 4B, the pre-splice offset was adjusted to produce the maximum post-splice notch depth (in this case 30 to 40 dB) which ideally corresponds to equal excitation of its $LP_{01}$ and $LP_{11}$ mode groups. The measured FSR of the filters are consistent with the fiber parameters, given the lengths of FMF 312 are known to be 135 m and 19 m, and its manufactured specified $\Delta t_{12}$ of 2.1 ps/m.

FIG. 4C shows the S21 power transfer functions of, according to another embodiment, the 4-mode FMF-MPF after another offset splice and for different lengths of FMF 312. Curve 412 are the results from an embodiment where FMF 312 is 89 m. Curve 414 are the results from an embodiment where FMF 312 is 17.5 m. In these embodiments, three-tap passband filters are formed due to the summation of primarily threes of its modes (the $LP_{01}$, $LP_{11}$, and $LP_{21}$) on photodiode 314. The measured FSRs of the filter are consistent with the lengths of the 4-mode FMF 312, and the known DMGDs of the FMF 312 (in this case $\Delta t_{12}$=4.4. ps/m and $\Delta t_{13}$=8.9 ps/m). As one of ordinary skill will appreciate, these FMF-MPFs are particularly advantageous due to their relative simplicity of construction (compared to filter 200) and lower cost.

Figure 4E:
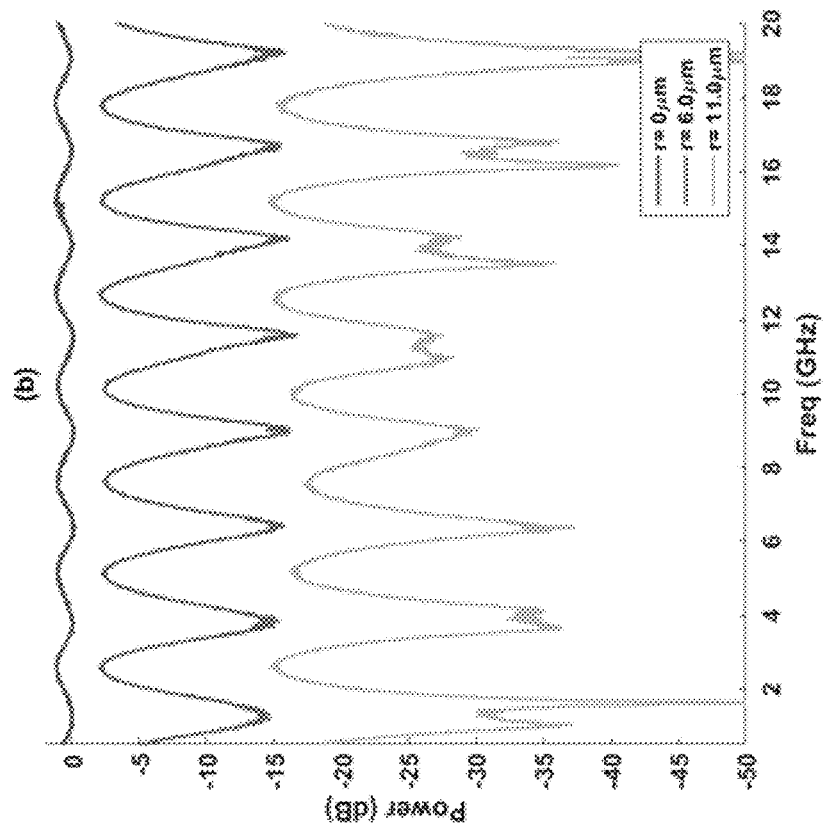
FIGS. 4D and 4E illustrate the power transfer function of a FMF-MPF according to one embodiment versus radial offset.
Figure 4D:
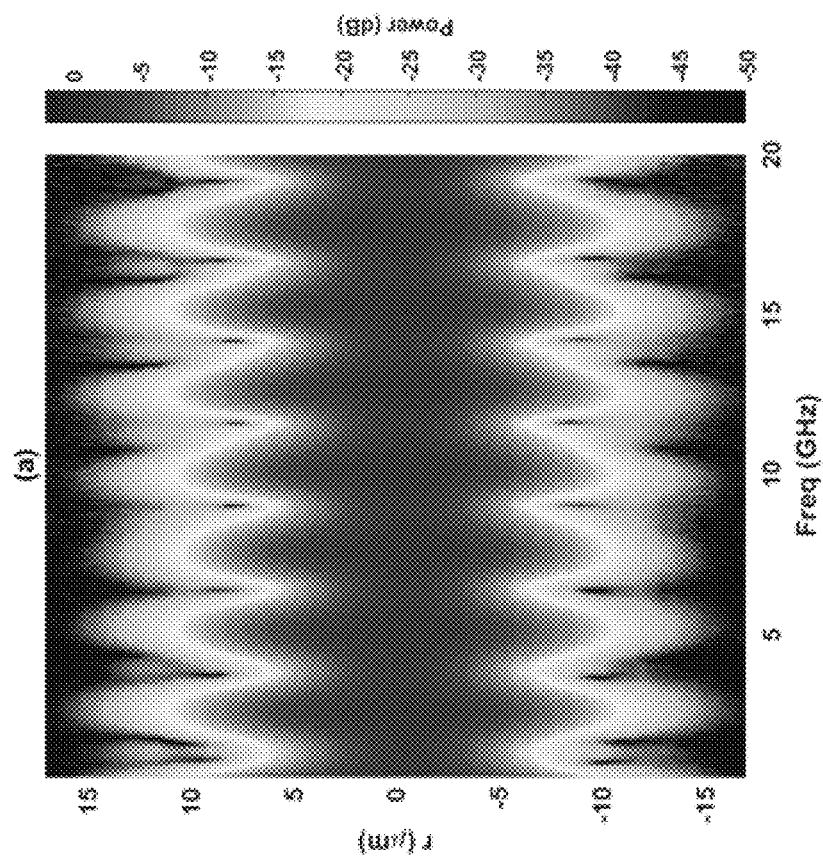

As noted above, HOM exciter 310 may also be implemented using a variable method where the offset between ends 404 and 406 are controlled by a translation stage 402. FIGS. 4D and 4E illustrate the power transfer function of a 4-mode FMF-MPF vs. radial offset of ends 404 and 406. In a preferred embodiment, the radial offset is measure from the center of a cross-section of FMF 312 to the approximate Gaussian spot from SMF 308. In this embodiment, the radial offset was controlled by a translation stage to produce the range of power measurements shown in FIG. 4D. FIG. 4E are slices of data from FIG. 4D taken at three different radial offsets (0, 6, and 11 microns from top-to-bottom). In FIG. 4D the translation stage 402 moved the relative offset in increments of 0.5 microns, while holding the axial distance between ends 404 and 406 at a constant distance of 5 microns. As shown in FIG. 4E, by varying the radial offset the function of filter 300 is change. When the offset is at 0 microns (the top curve), filter 300 is a negligible filter. When the offset is at 6 microns (middle curve), filter 300 is a two-tap notch filter. When the offset is at 11 microns (bottom curve), filter 300 is a 3-tap passband filter. Thus, with the variable offset method, filter 300 has flexibility in its function, due to the fact that the filter amplitude coefficients (as) of the modes can be adjusted through adjustment of the relative offsets between the FMF 312 and the excitation field.

Figure 5:
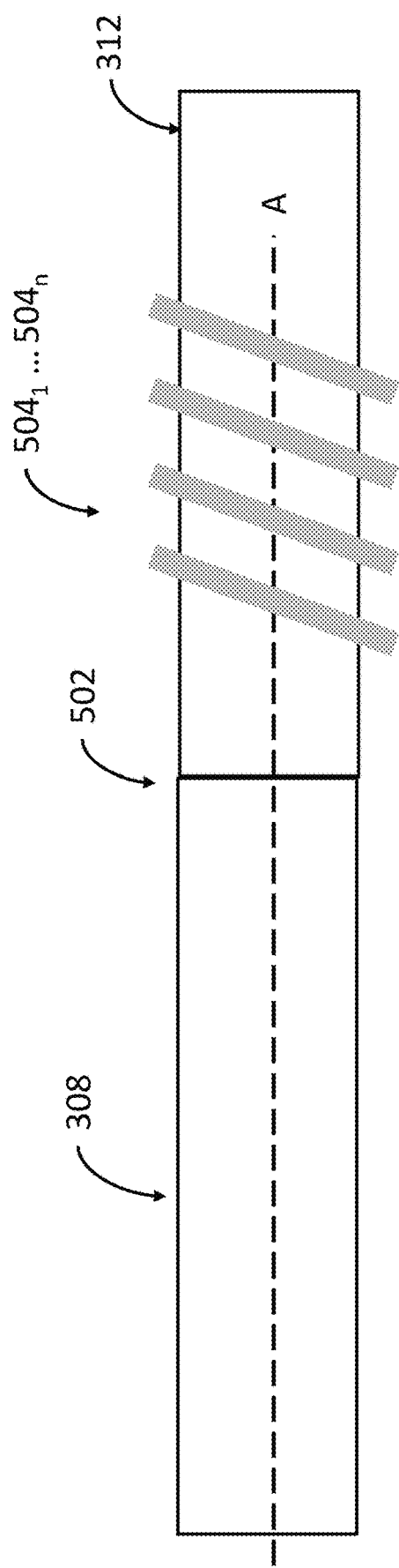
FIG. 5 illustrates a method of implementing an HOM exciter using mode converters.
Figure 6:
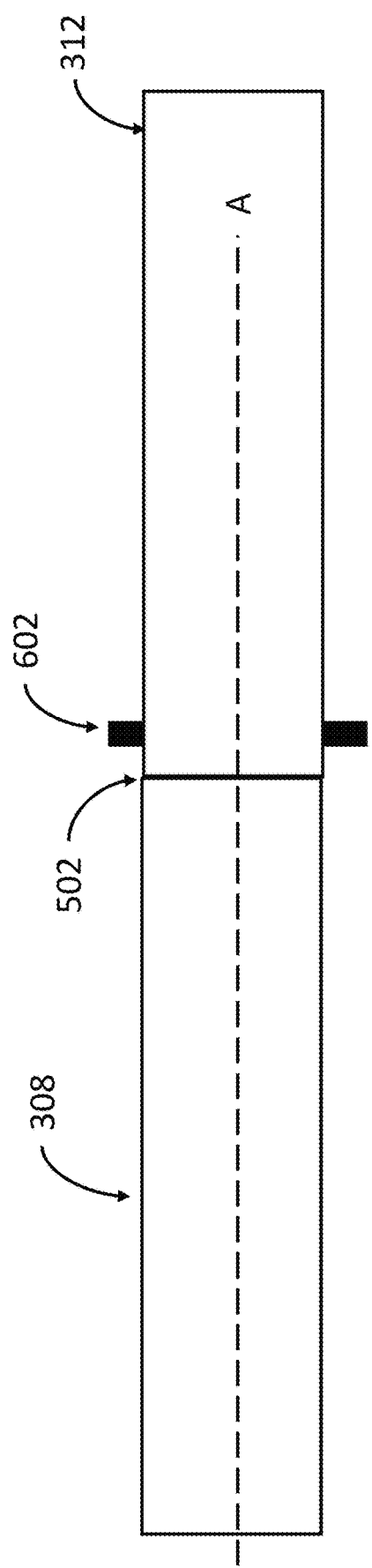
FIG. 6 illustrates another method of implementing an HOM exciter using mode converters.

FIGS. 5 and 6 illustrate another method of implementing an HOM 310 that uses mode converters. As shown in FIG. 5, SMF 308 and FMF 312 are spliced together to form a splice 502 with no radial offset. The fundamental mode of FMF 312 can be coupled to its higher order mode(s) and vice versa with application of the correct periodic perturbations, matched to the spatial beat length between the two modes. In FMF's, the required periodicity for mode to mode coupling can be on the order of hundreds of microns to mm's (dependent on the mode differential effective refractive indices of the specific FMF). Hence, these particular mode conversion devices have been deemed long period gratings (LPGs). In FIG. 5, LPGs are permanently written into the fiber (with a fixed mode conversion efficiency) using fiber grating methods, described below. Alternatively, LPGs may be mechanical where, in one embodiment, periodic pressure is applied to the optical fiber using a machined metal plate and the mode conversion efficiency is dependent on the applied pressure and the plate properties. This is illustrated in FIG. 6, where a mechanical LPG-MC 602 is placed after the splice 502 between SMF 308 and FMF 312. In one embodiment, LPG-MC 602 is placed 1 cm away from splice 502.

Still further, an acousto-optic mode converter may be used. In an acousto-optic mode converter, transverse or longitudinal acoustic waves are mechanically induced in FMF 312 via vibrations from an attached piezoelectric device. The induced acoustic wavelengths are matched to the spatial beat length between the modes of FMF 312, creating the periodic perturbations necessary for mode conversion.

In FIG. 5, long period grating mode converters (LPG-MCs) $504_1 \ldots 504_n$ are placed (or are permanently written into the FMF 312) at selected positions along the length of FMF 312. The filter amplitude coefficients (as) are determined by the conversion efficiency of the LPG-MCs $504_1 \ldots 504_n$. In an embodiment where the LPG-MCs are mechanical, the conversion efficiency can be changed by controlling the applied pressure to the FMF 312. The optical delays (TO of the filter are determined by the propagation distances between LPG-MCs $504_1 \ldots 504_n$ and the end of the FMF 312. Hence, each individual mode has its own propagation distance, $L_n$ enabling individual adjustment of the filter's differential optical delays ($\tau_n$) during fabrication and/or operation. This is in contrast to the offset/variable method of HOM where the optical delays ($\tau_n$) are constrained by the intrinsic DMGDs of the FMF 312 and the collective propagation distance, L, of all modes.

Figure 7:
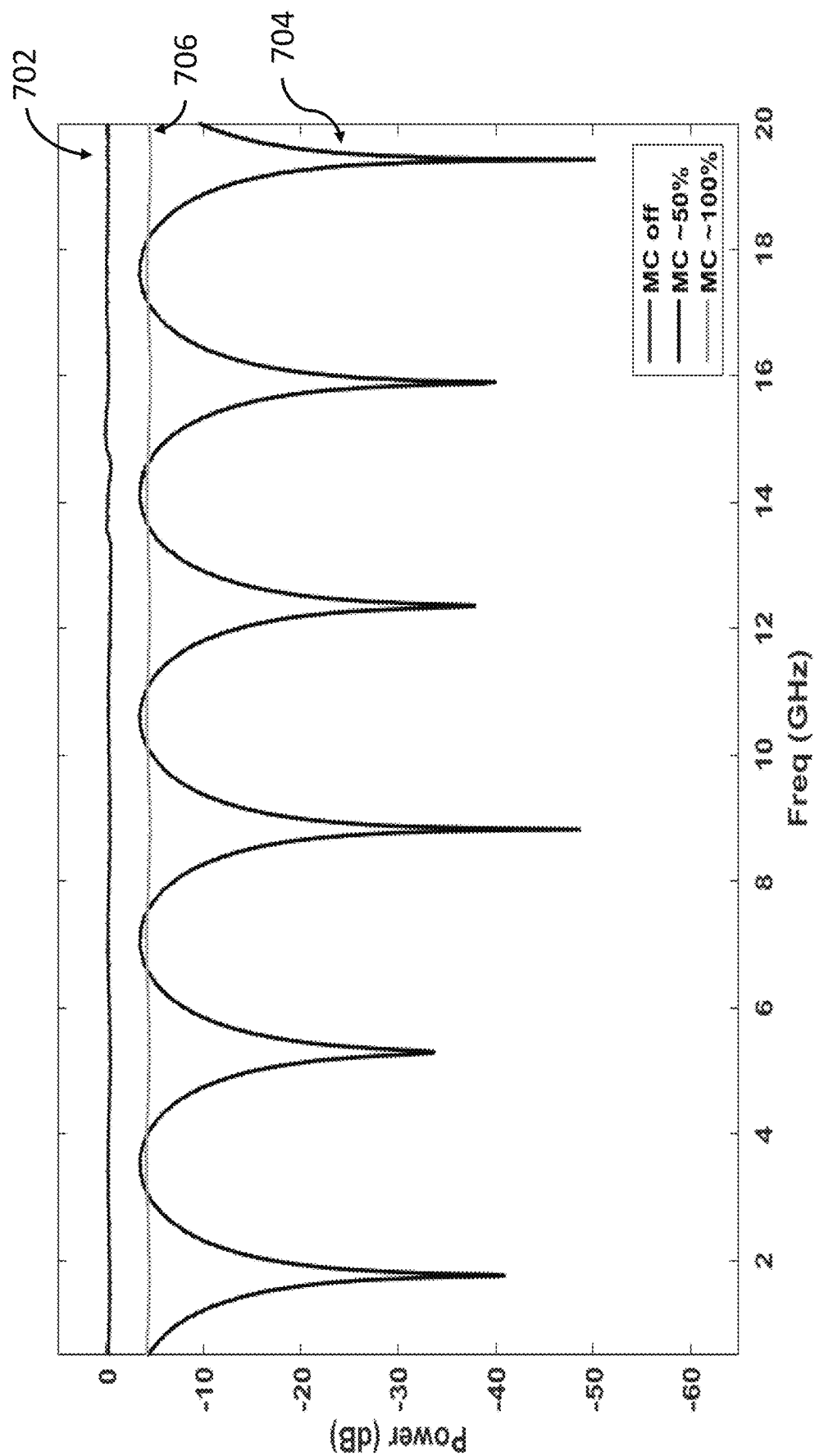
FIG. 7 illustrates the power transfer function of a filter according to one embodiment the uses a mechanical mode converter.

FIG. 7 shows the power transfer functions ($S_{21}$) of a 2-mode FMF-MPF 300 that uses a mechanical mode converter (as shown in FIG. 6) for HOM exciter 310. With no offset at splice 502, primarily only the FMF's 312 fundamental mode is excited. Consequently, there is no microwave filtering effect in the measured power transfer function 702. When periodic pressure from LPG-MC 602 is applied to the FMF 312, a portion of the $LP_{01}$ mode is converted into the $LP_{11}$ (with a conversion efficiency dependent upon the pressure applied). In FIG. 7, the pressure applied to FMF 312 by LPG-MC 602 was adjusted to maximize the filter notch depth, as illustrated by power transfer function 704. This case ideally corresponds to 50% conversion of the $LP_{01}$ mode to the $LP_{11}$ mode. If the pressure is increased even further the transfer function 706 reverts back to the frequency-independent case, with higher overall loss due to the increased mechanical stress on FMF 312. In this case, nearly 100% of the $LP_{01}$ modes has been converted into $LP_{11}$ mode.

Implementing filter 300 with a HOM exciter 310 that employs a mode converters offers great flexibility in controlling the filter shape, as both the amplitude coefficients ($a_n$) and the optical delays ($\tau_n$) can be controlled by adjusting the mode converter efficiencies and positions during operation and/or fabrication. As one skilled in the art will appreciate, by using a mode converter the number of taps created in filter 300 can be greater than the number of modes in the FMF 312.

Figure 8B:
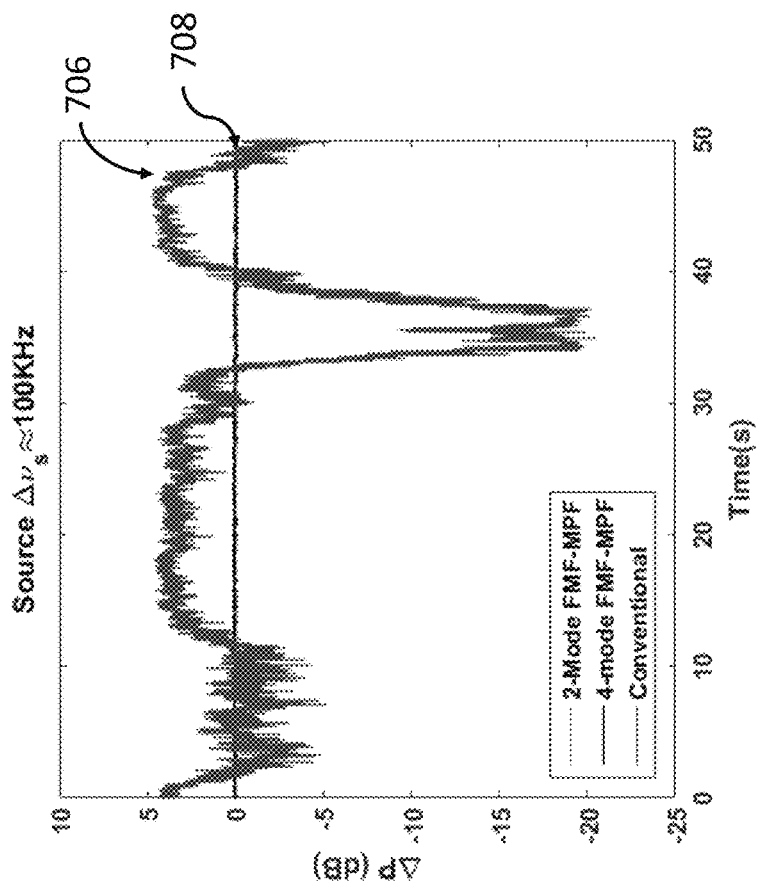
FIGS. 8A and 8B are graphs of power fluctuations in filters described herein versus a conventional filter.
Figure 8A:
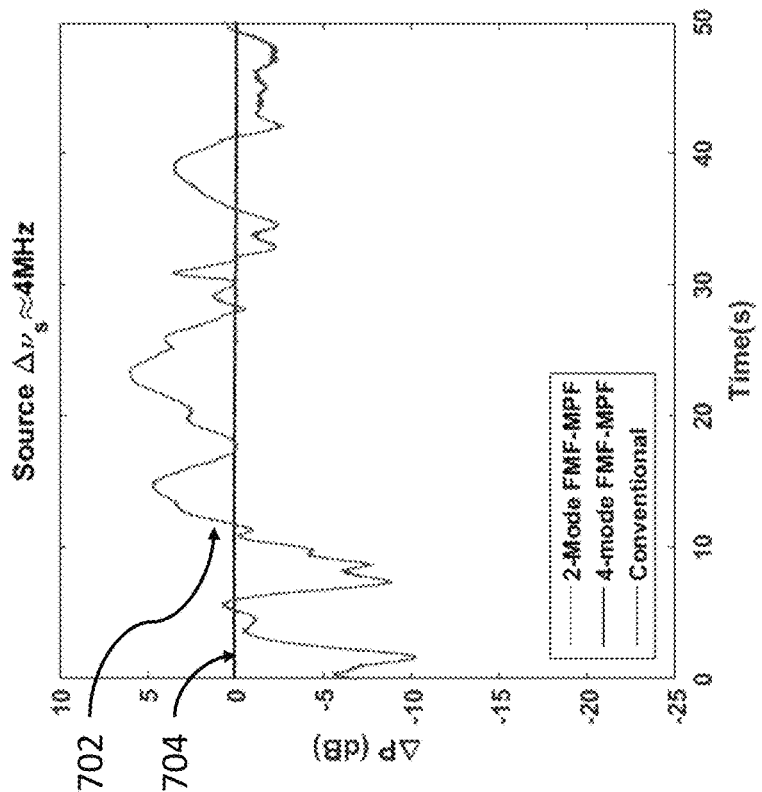

FIGS. 8A and 8B are graphs of power fluctuations $\Delta P$ of single peaks in each of the demonstrated filters S21 (704 and 708) function over 50-second durations (corresponding to 1600 data points, with 32 ms between points) using two optical sources with different coherence times. For comparison, the power fluctuations of a conventional two-tap SMF optical delay line filter 200 are also plotted (702 and 706). To make a fair comparison, the conventional filter 200 was modified to utilize the same optical sources 302, EOM 307, and photodiode 314, with N=2 and the optical delay set to 819 ps. In FIGS. 8A and 8B, the results of the 2-mode and 4-mode FMF-MPFs 300 (704 and 708) are nearly identical, exhibiting fluctuations less than or equal to 0.5 db peak to peak over the measured 50 s interval. In stark contrast, the conventional filter 200 fluctuated by 19 dB and 25 db using the 4 MHz (FIG. 8A) source and the 100 KHz (FIG. 8B) source respectively. It should be noted that the FMF-MPFs 300 exhibited negligible coherent interference effects, unlike the conventional filter 200. The FMF-MPFs stability, despite operation in the coherent regime, is a consequence of the utilization of the FMF 312 spatial modes as the separate optical delay lines of the filter 300, minimizing any coherent interference effects along their common propagation path until summation upon the photodiode 314.

Figure 9:
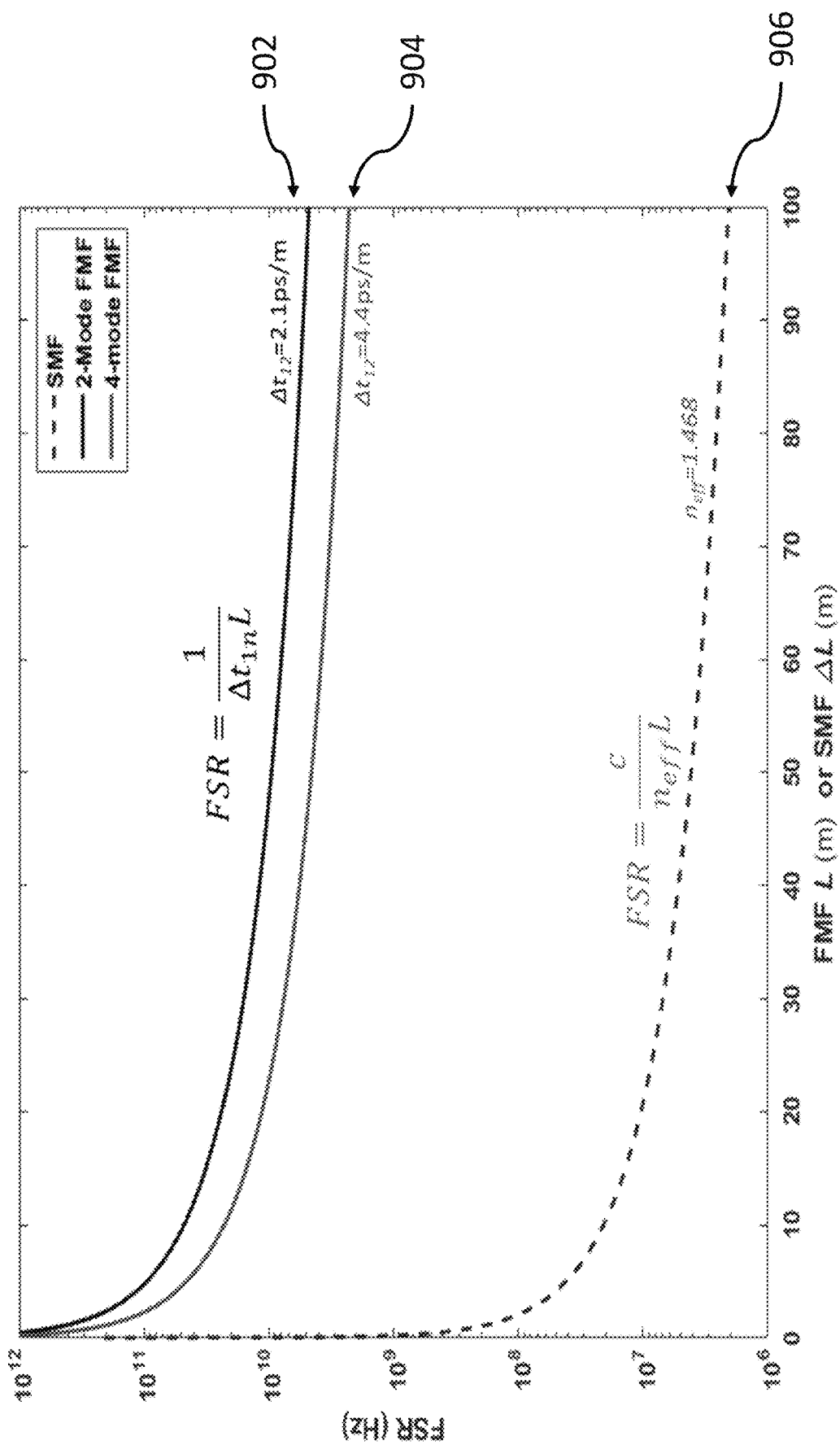
FIG. 9 shows the accessible range of free spectral ranges (FSRs) of filters described herein versus a conventional filter.

FIG. 9 illustrates another advantage of the filter embodiments described above. FIG. 9 shows the accessible range of FSRs plotted as a function of the FMF 312 length (L) for the FMF-MPF filters 300 described above, including a 2-mode filter (902) and a 4-mode filter (904). Also plotted for comparison is the accessible FSRs of an SMF-based optical delay line filter 200 as a function of the differential length ΔL of its taps. As shown in FIG. 9, depending on the choice of FMF 312, FMF-MPFs 300 can reach orders of magnitude higher FSRs than convention SMF-based optical delay line filters 200, conceivably even hundreds of GHz, with less components and eased fabrication constraints. For example, to create a notch filter with an FSR of 20.0±0.1 GHz using a conventional SMF-based optical delay line filter geometry, its ΔL must be trimmed to 10.38 mm with an accuracy of ±50 microns. In contrast, a 2-mode FMF-MPF filter 300, the length of FMF 312 must be 23.81 m (to meet the same requirement) with an accuracy of 12 cm, which is far more lenient.

Described above are robust and relatively simple to fabricate FMF-MPF filters 300 which exhibit high stability in the coherence regime.

While various example embodiments of the invention have been described above, it should be understood that they have been presented by way of example, and not limitation. It is apparent to persons skilled in the relevant art(s) that various changes in form and detail can be made therein. Thus, the disclosure should not be limited by any of the above described example embodiments, but should be defined only in accordance with the following claims and their equivalents.

In addition, it should be understood that the figures are presented for example purposes only. The architecture of the example embodiments presented herein is sufficiently flexible and configurable, such that it may be utilized and navigated in ways other than that shown in the accompanying figures.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A microwave photonic filter, comprising:
   an optical source;
   an electro-optic modulator configured to receive an optical carrier from the optical source and an input electrical signal, wherein the electro-optic modulator modulates the optical carrier based on the input electrical signal;
   a single mode optical fiber configured to receive the modulated optical carrier from the electro-optic modulator;
   a few-mode optical fiber configured to receive the modulated optical carrier from the single mode optical fiber;
   a mode converter configured to generate at least one higher excitation mode in the few-mode optical fiber; and
   a photodiode configured to receive an output from the few-mode optical fiber,
   wherein the mode converter is a piezoelectric device attached to the few-mode optical fiber and constructed to induce acoustic waves in the few-mode optical fiber.

2. The filter according to claim 1, wherein a wavelength of the induced acoustic waves corresponds to a spatial beat length between modes of the few-mode optical fiber.

3. The filter according to claim 1, wherein the optical carrier is a laser beam.

4. The filter according to claim 1, wherein the electro-optic modulator is one of: a quadrature-based Mach-Zehnder modulator or an EOSpace AX intensity modulator.

5. The filter according to claim 1, wherein the few-mode optical fiber is a four mode optical fiber.

6. The filter according to claim 1, wherein the few-mode optical fiber is a two mode optical fiber.

7. The filter according to claim 1, wherein the acoustic waves are transverse or longitudinal acoustic waves.

* * * * *